April 15, 1930.         J. H. GRUBE         1,754,552
CAN OPENER
Filed Aug. 31, 1927
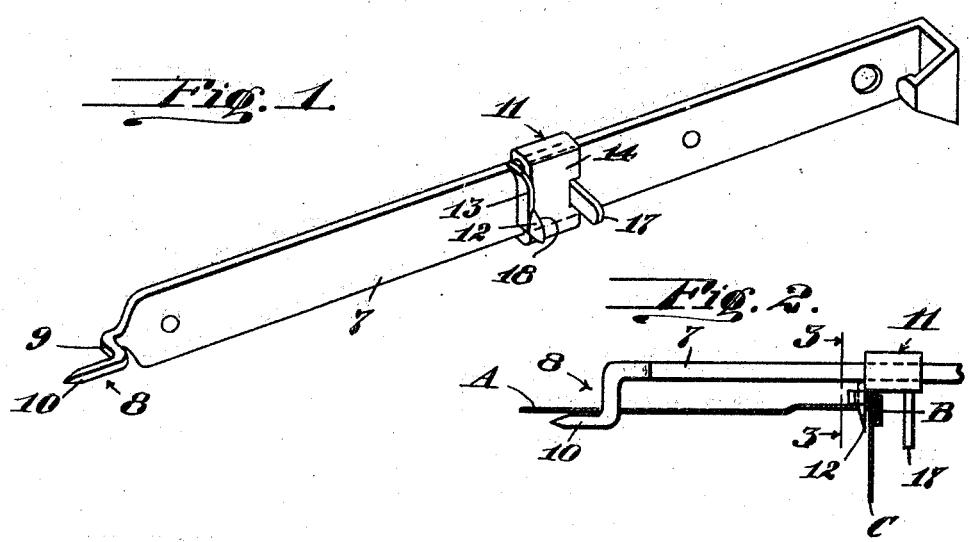
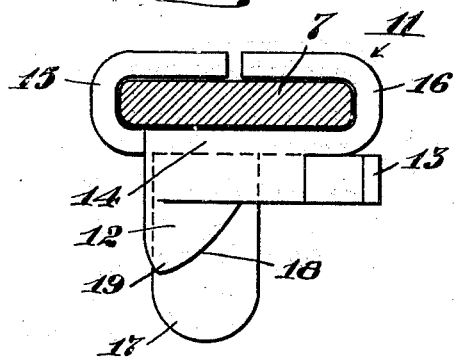
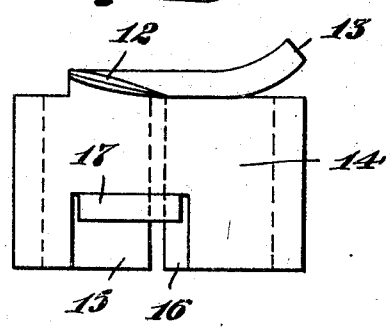
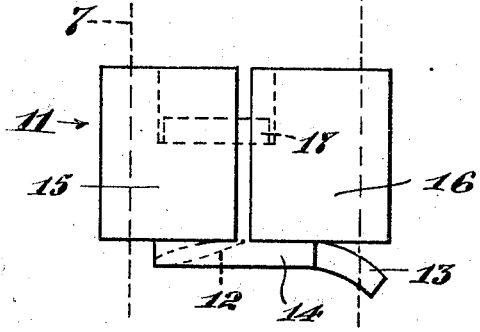
Inventor.
John H. Grube;
By R. S. Berry
Atty.

Patented Apr. 15, 1930

1,754,552

UNITED STATES PATENT OFFICE

JOHN H. GRUBE, OF PASADENA, CALIFORNIA, ASSIGNOR TO LEWIS B. EYER, OF LOS ANGELES, CALIFORNIA

CAN OPENER

Application filed August 31, 1927. Serial No. 216,561.

This invention relates to a can opener of that type wherein a bar is provided at one end with a spur adapted to form a central puncture in the top of a can, and such bar is provided also at a point spaced away from the spur-carrying end with a cutter adapted to cut a circular piece out of the can top.

An object of the invention is to provide improved means to guide the cutting element so that it will completely cut away the entire portion of the can top within the rim and yet will not scrape against or cut into the can rim by reason of the tendency of said cutting blade to move centrifugally while the gyratory cutting movement is being given to the bar upon which it is slidably mounted.

A further object of the invention is to provide a combined cutter and guide for can-opening implements which will possess clear advantages over the cutting devices and their guiding means now in use.

Other objects and advantages will hereinafter more fully appear when the invention is considered in detail as illustrated by the accompanying drawings, which show a preferred embodiment thereof.

Referring to the said drawings:

Fig. 1 is a perspective view of the complete device;
Fig. 2 is a side elevation thereof, a portion of the bar whereon the cutter is mounted being broken away in order to contract the view, and a portion of the can top being shown in section with the device in the operative position thereon;

Fig. 3 is a cross-section on an enlarged scale on line 3—3 of Fig. 2;

Fig. 4 is a top plan view of the cutting element and its carriage;
Fig. 5 is a bottom plan of the same.

Referring in detail to the drawings, the main bar or handle member 7 is a piece of strap metal which is provided at one end with a spur 8, which is adapted to puncture a sheet metal can top, said spur having a shank 9 which extends at right angles to said bar 7 and an offset pointed portion 10 which is bent to project outwardly with respect to the bar as a whole.
Upon the bar 7 is slidably fitted a sleeve 11 which carries a cutting blade 12 and which also carries a guide 13 designed to direct the course of said blade during its cutting movement. Said blade 12 and guide 13 are by preference and as shown formed in one piece with the sleeve 11; the sleeve being preferably formed of sheet metal and as here shown embodies a central body portion 14 adapted to lie against the underside of the handle and including end portions 15 and 16 which are bent upwardly and turned inwardly toward each other to extend alongside the parallel side margins of the handle and project over the top of the latter as particularly shown in Fig. 3. The blade 12 and the guide 13 project downwardly from the forward margin of the body portion 14 of the sleeve and projecting downwardly from the opposite margin of the sleeve and spaced in relation to the blade 12 is a second guide 17. The blade 12 is arranged to extend to one side of the longitudinal center of the handle and sleeve and extends diagonally at a slight angle with relation to a line extending at right angles to the longitudinal margins of the handle; the cutting edge 18 of the blade being formed on the margin thereof farthermost from the can top engaging spur 8. The blade 12 is also tapered longitudinally and converges to a point 19 to facilitate penetration of the can top. By arranging the blade diagonally the cutting edge 18 thereof will be presented tangentially to the margin of a can top with the cutting edge of the blade presented toward such margin when the device is applied. The guide 13 projects forward of the cutting edge of the blade and is curved outwardly at its outer end which guide is designed to abut against the inner face of the double seam connecting the can top and can body.

In the application and operation of the invention, the spur 8 is driven into the can top A at or adjacent to the center thereof so as to engage the can top as shown in Fig. 2 whereupon the sleeve 11 is positioned to dispose the blade 12 and guide 17 astride the flange B formed by the double seam connection between the can top A and the can body C. The blade is then driven into the can top to penetrate the latter contiguous the inner margin of the flange B whereupon on advancing the handle with a gyratory movement around its pivotal connection with the can top afforded by the spur 8, in the general direction of the cutting edge of the blade, severance of the can top will be effected. The blade extending tangentially toward the flange B will tend to advance outwardly toward the flange but by reason of the guide 13 projecting forward of the blade so as to abut against the flange will be inhibited from cutting into the flange. It follows that in severing the can top, the line of severance will extend close to the flange B; the sleeve 11 by reason of being freely slidable on the handle shifting longitudinally thereof such distance as may be necessary to compensate for eccentric positioning of the spur 8. The tendency of the blade to advance outwardly toward the flange is further augmented by positioning of the blade to the rear side of the longitudinal center of the handle, as in advancing the handle the forwardmost edge of the latter engaging the upturned edge portion 16 of the sleeve will effect a pulling action on the blade to draw the latter in contra-distinction to a pushing action as is ordinarily effected in can openers of this type. The guide flange 17 serves as an aid in initially positioning the blade against the inner face of the flange B but is not essential and may in some instances be dispensed with.

I claim:

In a can opener, a handle, means on one end of said handle for effecting pivotal connection with the can top, a sleeve slidable longitudinally of said handle, and a blade projecting from said sleeve, said blade extending diagonally with relation to said handle with its cutting edge extending away from the end of the handle carrying the can top engaging means, said cutting edge tending to cause the cutter to move tangentially, and a guide projecting in advance of the cutting edge of said blade and adapted to engage the inner side of the peripheral flange of the can top thereby opposing the tendency of said cutter to move tangentially.

In testimony whereof, I have affixed my signature.

JOHN H. GRUBE.